Aug. 28, 1962   J. M. JOST   3,051,558
HYDROTHERMAL SYNTHESIS OF QUARTZ
Filed Sept. 6, 1956   2 Sheets-Sheet 1
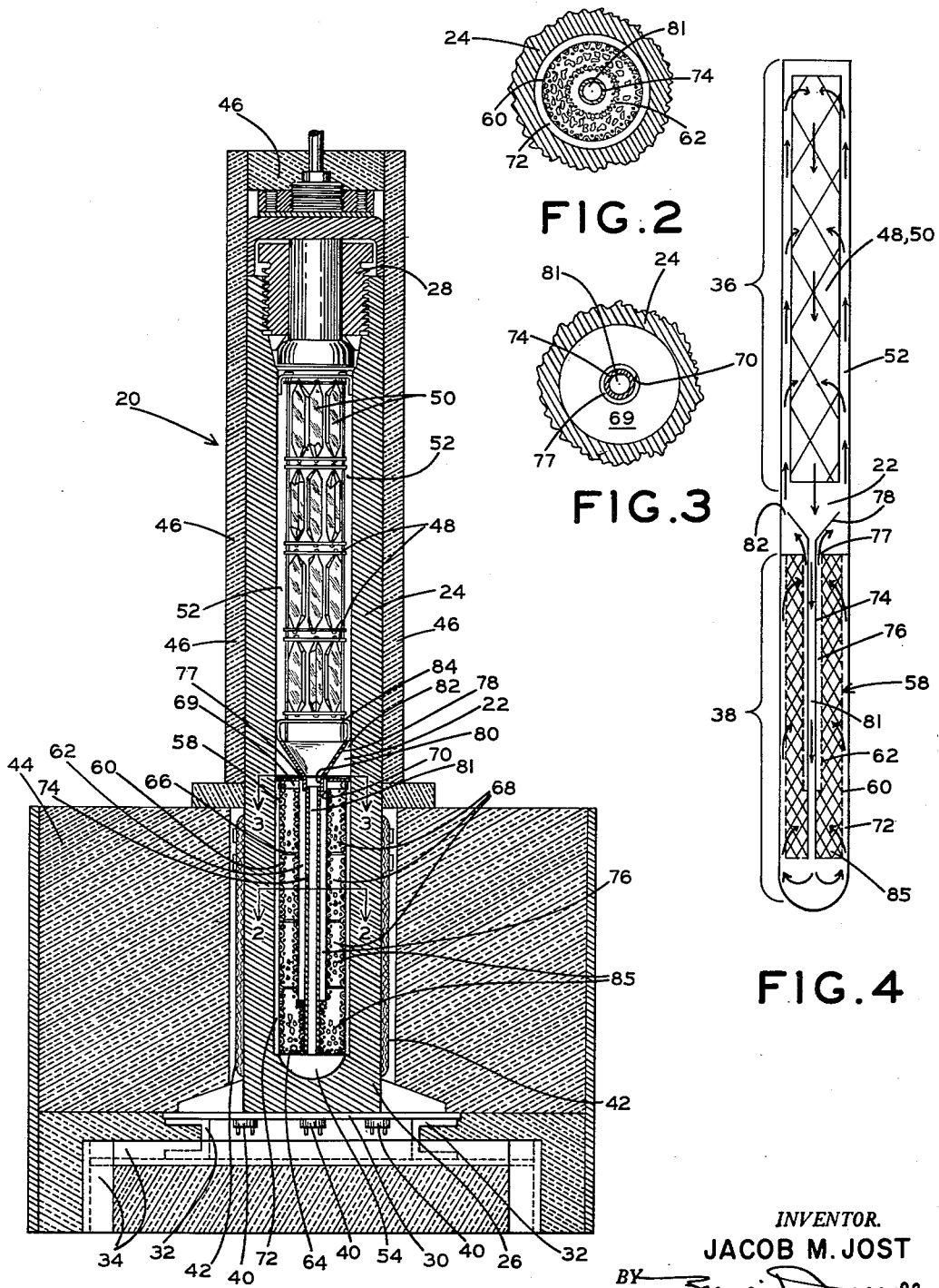
INVENTOR.
JACOB M. JOST
BY
ATTORNEY Aug. 28, 1962   J. M. JOST   3,051,558
HYDROTHERMAL SYNTHESIS OF QUARTZ
Filed Sept. 6, 1956   2 Sheets-Sheet 2

INVENTOR.
JACOB M. JOST
BY
ATTORNEY

3,051,558
HYDROTHERMAL SYNTHESIS OF QUARTZ
Jacob M. Jost, Cleveland, Ohio, assignor to Clevite Corporation, Cleveland, Ohio, a corporation of Ohio
Filed Sept. 6, 1956, Ser. No. 608,384
12 Claims. (Cl. 23—273)

This invention relates to methods and apparatus for the hydrothermal synthesis of quartz in the form of single crystals.

The term "hydrothermal synthesis" is used herein to designate a crystallization process, carried on at relatively high temperatures and pressures, wherein the material to be crystallized is dissolved essentially to saturation in a fluid transfer medium at one temperature and deposited on a seed body at a lower temperature. In its general aspects, the process and many variations are well known and have been applied to the production of crystals of various materials in addition to quartz.

As applied to quartz synthesis, the hydrothermal process requires the use of high pressures and temperatures in order to effect sufficient dissolution of the supply material (e.g., crystalline silica) to render the process feasible from a practical standpoint. Apparatus for carrying out such a process are known and may be referred to as "autoclaves."

While the first successful synthesis of crystalline quartz dates back several decades it was not until recently that crystals of potentially useful size could be produced and even more recently that the production of synthetic quartz crystals in commercial quantities, qualities and sizes has been realized. Such production can be and has been accomplished by the use of the method and apparatus disclosed in U.S. Letters Patent No. 2,675,303 to Sobek and Hale and assigned to the same assignee as the present invention. Reference to this patent may be had for a complete explanation and the details of the hydrothermal process as applied to quartz synthesis.

At the present time quartz crystals, natural or synthetic, find extensive applications in the optical and electronic industries. While the most important use for such crystals is for the fabrication of oscillator plates used for frequency control, all known electronic and optical uses for quartz crystal require the crystals to be free from substantial impurities, physical defects, electrical and optical twinning, etc. Crystals of suitable quality are referred to as being of "electronic grade" or "optical grade" as the case may be.

Aside from the fact synthetic quartz obviates the necessity of dependence on foreign sources, it has many other inherent advantages over natural quartz, particularly: (1) the quality is better and is subject to control and (2) the size and shape of the grown crystals are, to a great degree, subject to selective variation to obtain dimensions and configurations best suited to the efficient fabrication of the crystal element to be manufactured. Thus, for example, by use of a seed body of particular dimensions and/or orientation relative to its crystallographic axes a crystal can be grown which is of optimum size and shape to enable cutting of oscillator plates with a minimum of time, labor and waste. The sole advantage of natural quartz existing heretofore has been its lower cost in terms of price per pound of raw material; this is largely offset by labor and waste reductions accruing to the use of synthetic quartz in fabricating quartz elements.

It is the fundamental object of the present invention to provide an improved apparatus for hydrothermal synthesis of quartz which overcomes one or more of the disadvantages of prior art apparatus.

Thus, it is a more specific object to provide apparatus which is more compact, simpler in construction, and less expensive in first, maintenance, and operating cost than any known heretofore.

Another object of the invention is the provision of apparatus for producing quartz in high quality single crystal form at low cost and at a high production rate per unit of apparatus.

Still another object is the provision of apparatus which enables the production of relatively large quantities of high quality quartz crystals per single apparatus unit with a minimum variation in size and/or quality of crystals in a batch.

A further object is the provision of apparatus for quartz synthesis which provides improved circulation of the transfer medium and embodies no moving parts.

These and other advantages of the invention will be apparent to those skilled in the art from a reading of the following description and subjoined claims in conjunction with the annexed drawings.

The present invention contemplates apparatus for the hydrothermal synthesis of quartz in single crystal form which comprises a vertically elongated enclosed chamber adapted to contain a fluid transfer medium under conditions of high temperature and pressure. The chamber has a quartz growing region and, therebelow, a source-material supply region. Means are provided to supply heat to the lower end of the chamber and to control circulation of the fluid transfer medium in the chamber, directing the convectional flow upwardly along the walls of the chamber in the growing region and centrally axially downward through the growing region into the supply region.

According to a particular feature of the invention, the circulation control means, which includes a baffle interposed between the growing and supply regions, is so constructed and arranged as to define and limit flow communication between the two regions to an upward and a downward flow-passage, jointly controlling and directing the convectional flow of the transfer medium. Each of the flow-passages is restricted, individually and collectively having cross-sectional areas relatively small in comparison to that of the chamber. The downward flow-passage is substantially centrally located with respect to the vertical center-line of the chamber while the upward flow-passage is located adjacent the lateral margin of the chamber and opens into the growing region at a substantial distance above the level where the downward flow-passage opens into the supply region.

In the drawings:

FIGURE 1 is a vertical sectional view of quartz synthesizing apparatus, viz., an autoclave, according to the present invention;

FIGS. 2 and 3 are horizontal cross-sectional views taken, respectively, on lines 2—2 and 3—3 of FIGURE 1;

FIGURE 4 is a schematic view of a portion of the structure shown in FIGURE 1;

Figures 6, 9:
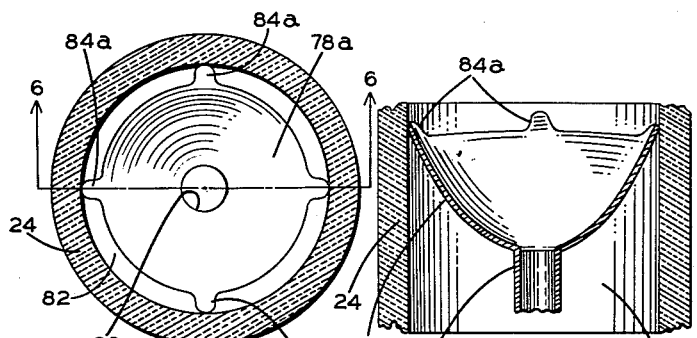
Figures 7, 10:
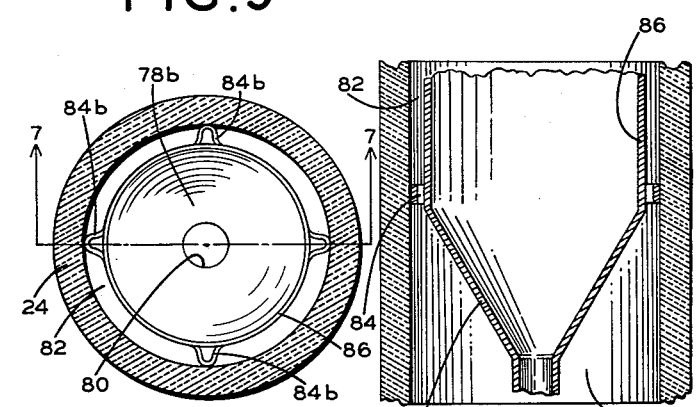
Figures 8, 11:
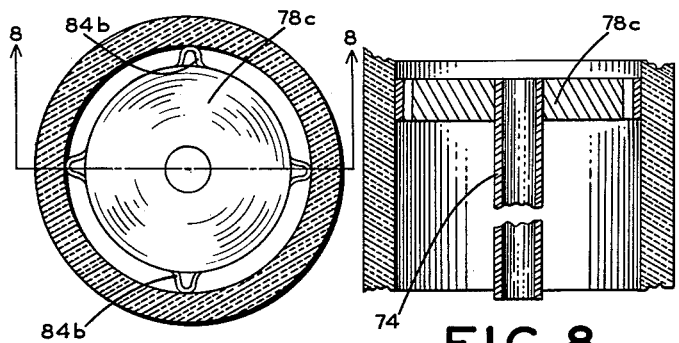

FIGURES 6, 7 and 8 are fragmentary vertical sectional views of various additional modifications of the invention taken, respectively, on lines 6—6, 7—7 and 8—8 of FIGURES 9, 10 and 11, and FIGURES 9, 10 and 11 are top plan views corresponding respectively to FIGURES 6, 7 and 8.

In FIGURE 1 there is illustrated in substantial detail a vertical autoclave 20 embodying the present invention in one of its preferred forms. Thus autoclave 20 comprises means defining a vertically elongated enclosed chamber 22. The chamber defining means include a cylindrical heavy-walled pressure vessel 24, having an integral bottom wall 26, and a threadedly removable upper end closure assembly 28. Pressure vessel 24 is mounted in a vertical position on a flat plate 30 supported by a pair of channel irons 32 which in turn are mounted on a suitable base or supporting structure 34. The details of closure assembly 28 and base 34 are not germane to the present invention and, therefore, will not be described. It is only necessary that the closure assembly 28 be capable of effectively sealing chamber 22 against leakage under conditions of very high temperatures and pressures. To this same end pressure vessel 24 should be fabricated of a suitable metal or alloy which will provide sufficient mechanical strength to withstand such conditions for relatively long periods of time without danger of rupture or leakage. In addition the internal surfaces of pressure vessel 24 and all surfaces exposed to the interior chamber 22 should not be subject to appreciable corrosion by, or otherwise susceptible to reaction with, the fluid transfer medium contained in the chamber as hereinafter explained. To fulfill these requirements it is preferred that the pressure vessel 24 be fabricated of alloy steel such as 400 series type stainless steels or equivalent. Where lower temperatures and pressures are used, carbon steels are satisfactory.

As best shown in FIGURE 4, chamber 22 has a growing region 36 in its upper end and a source material supply region 38 in its lower end. By upper and lower end it is meant to signify that the growing region 36 is above or uppermost in chamber 22 with respect to supply region 38 and not that each region occupies any particular proportion of the total length of the chamber. From the standpoint of production economy it is desirable that the growing region occupy as great a percentage of the volume of chamber 22 as consistent with the operating conditions and principles hereinafter set forth. In most cases the growing region would occupy, at least, approximately the upper half of the length of chamber 22.

For reasons which will become apparent as the description proceeds, it is preferred that chamber 22 is generally cylindrical and has an axial or vertical dimension large in comparison to its diameter. In its preferred form chamber 22 would have a length-to-diameter ratio (aspect ratio) in the range from about 5:1 to 15:1 and the quartz growing region 36 would occupy somewhat more than the upper half of the length of the chamber, the remainder being devoted principally to the supply region 38.

Means are provided for supplying heat to the lower end of chamber 22 such means taking the form of a plurality of electrical heater elements 40, secured to the underside of plate 30 adjacent the bottom of pressure vessel 24, and perimeter heater elements 42 enveloping the lower end of the vessel along substantially the entire length of the supply region 38. Heater elements 40 and 42 are connected to a source (not shown) of electrical power through suitable controls, manual or automatic, which enable regulation of the amount of heat supplied thereby. The electrical connections and controls for heater elements 40 and 42, being of conventional design, are not shown in the drawing.

The lower portion of vessel 24, which defines and encloses supply region 38 of chamber 22, including the heater elements, is encased in a suitable heat insulating material 44 so as to substantially preclude or at least minimize heat loss from the supply region. The remainder of the pressure vessel is covered with lagging or thermal insulation 46 of lesser effectiveness so as to allow a selected pattern and amount of heat rejection from growing region 36 through the walls of pressure vessel 24. The type and quantity of insulation material applied around the growing region 36, in conjunction with other factors presently to be explained, establishes a selected negative temperature differential between the supply region 38 and growing region 36 of chamber 22.

Within the growing region 36 of chamber 22 are provided crystal holders or racks 48 which serve to mount a plurality of seed bodies in spaced relationship so that each seed body is exposed to the fluid transfer medium. In FIGURE 1, the racks are illustrated as being filled with grown crystals 50 rather than seed bodies. The crystal racks are removably supported within the vessel 24 by any suitable mechanical arrangement; for example, the racks may be suspended from the closure assembly 28 or supported on other structure occupying the lower portion of chamber 22 as hereinafter described. However, regardless of the form of the racks or the manner in which they are supported within the vessel they must be so constructed and arranged as to securely hold the seed bodies and the resulting grown crystals in spaced relation to the surrounding inner wall of vessel 24; that is, so that an unobstructed annular clearance space 52, extending the entire length of growing region 36, exists between the loaded crystal racks and the inner wall of vessel 24. The width or radial dimension of clearance space 52 is an important detail; suitable values of this dimension will be apparent from the description hereinbelow of other structure and conditions which influence these values.

Preferably, the inner surface 54 of the bottom wall 26 of vessel 24 is hemispherical, as shown in FIGURE 1; however, any concave curvature would be satisfactory and even a flat surface would be operative to a degree. At a short distance above the inner bottom surface 54 is an annular shoulder 56 which supports a container 58 for supply material (e.g. crystalline silica) disposed in supply region 38.

Container 58 is fabricated almost entirely of a perforate material such as wire mesh, expanded metal, or sheet metal containing a large number of holes. In the illustrated embodiment, container 58 takes the form of an elongated hollow cylinder of wire mesh, as best appears in FIGURE 4. Thus, the container comprises a concentric cylindrical outer wall 60 and inner wall 62, both of wire mesh. The bottom 64 of the hollow cylinder is also formed of wire mesh, as are a number of transverse annular partions 66 which divide the cylinder into a number of separate compartments 68. The top of container 58 is formed by a solid plate 69 which, except for a central opening 70 in the plate, fills the cross-section of chamber 22. Outer container wall 60 is of lesser diameter than chamber 22 with the result that an annular clearance space 72 is formed between the two which extends the entire length of the container.

While a container 58 of cylindrical shape has been shown and described, it will be understood that other cross-sectional configurations may be employed. Thus, for example, the outer wall might have a triangular cross-section with its apices in contact with the walls of chamber 22 so that, instead of a single annular clearance space 72, there would be three functionally equivalent clearance spaces defined between the chamber wall and the respective sides of the container. Alternatively, the triangular cross-section might be smaller so that the apices do not contact the chamber wall. In like manner, the cross-section of the container may be a square, hexagon or other polygon provided that, in any case a clearance space functionally equivalent to 72 is defined.

Coaxially extending through the central opening of container 58 is a tubular member 74, the lower end of which terminates flush with the bottom 64 thereof. The upper end of tubular member 74 extends through opening 70 and projects a short distance above top plate 69 of container 58. The outer diameter of tubular member 74 is smaller than the opening 70 and the inner diameter of inner wall 62 of container 58 so that annular clearance spaces 76 and 77 remain around the tubular member.

Connected to or formed integrally with the upper end of tubular member 74 is a baffle member 78 in the form of a funnel or hollow cone concentrically disposed in chamber 22 between growing region 36 and supply region 38 with its large circumference uppermost. Baffle member 78 and tubular member 74 jointly comprise a flow control means for the fluid transfer medium. To this end, the lower end of baffle 78 contains a central opening 80 in flow communication with the interior 81 of tubular member 74 which is, effectively, an extension of the baffle member and, with opening 80, constitutes a downward flow passage for the fluid transfer medium.

The circumference of the upper end of baffle 78 is appreciably smaller than that of chamber 22 so that an annular clearance 82 remains between the perimeter of the baffle and the surrounding wall of the chamber interrupted only by a diametral bracket member 84 secured to or integral with the baffle. Bracket 84 serves to center the baffle and may provide a support for seed racks 48.

The present invention contemplates and includes certain important details as to relative dimensions and essential features of various elements; however, inasmuch as these details are closely related to operating conditions in chamber 22, their disclosure will be simplified and more lucid in the light of the following explanation of the general operation and function of the apparatus as thus far described.

The individual compartments 68 of container 58 are filled with a suitable source of quartz, for example, crystalline silica 85, in large enough particle sizes as to prevent close packing. The amount of silica used should materially exceed that to be consumed in the run so that essentially complete saturation of the transfer medium at the dissolving temperature is maintained at all times.

Seed racks 48 are loaded with seed bodies of the desired crystallographic orientation, size and shape and installed, the chamber 22 is filled with a fluid transfer medium to about 70 or 80% of its capacity (the degree of filling and operating temperature determines the operating pressure), and the closure assembly 28 is secured in place. Satisfactory transfer mediums include, for example, an 0.83 molar aqueous solution of sodium carbonate ($Na_2CO_3$) or an aqueous solution of sodium carbonate and sodium acid carbonate ($NaHCO_3$) in amounts of 1 mol and $\frac{1}{16}$ mol per liter, respectively. The preferred range of operating temperatures is from 280° to 370° C. with a differential of 5° to 25° C. between the average temperatures of the supply and growing regions (the latter being cooler). The operating pressure range is from 1200 to 10,000 pounds per square inch and the degree of initial filling is selected on the basis of the intended operating temperature and vapor pressure or thermal expansion characteristics of the fluid transfer medium to achieve the desired pressure. The operating pressure is a function of temperature and vapor pressure if the chamber 22 contains a vapor space at operating conditions; otherwise the pressure is a function of temperature and the coefficient of thermal expansion of the fluid.

The autoclave having been loaded, the run is started by turning on the power to heater elements 40 and 42. Due to the location of the heat input, the relative disposition of the supply and growing regions, and the location and configuration of flow control means 74, 78, convectional circulation of the fluid medium results in a flow pattern which will now be described with reference to FIGURE 4, wherein the heavy-line arrows indicate the direction of fluid flow.

The fluid in the lower end (supply region 38) of chamber 22 is heated and concomitantly decreases in density. This causes the fluid to rise in clearance spaces 72 and 76. The upward movement of fluid in clearance space 72 of the supply region 38 is limited by plate 69; therefore, this fluid passes laterally inwardly and upwardly through the perforate walls of container 58 and the interstices between particles of the crystalline silica supply material 85 into clearance space 76. When the fluid temperature has reached a sufficiently high value the fluid, in its passage through the container 58 and its contents, it dissolves and carries with it an amount of silica until saturated. As the silica-bearing or nutrient fluid arrives in space 76, displacing the transfer medium originally occupying space 76, it passes upwardly around tubular member 74 through space 77 whereafter it encounters the underside of baffle 78 which directs the flow radially outward toward annular upward flow-passage 82 between the periphery of the large end of the baffle member 78 and the wall of chamber 22. The upward flow-passage 82 channels the upwardly moving fluid into a relatively thin boundary layer along the wall of the growing region 36. This boundary layer flow occupies clearance space 52 and a major portion of the flow continues upwardly to the top of the chamber 22. Some part of the upward flow branches off inwardly before reaching the top of chamber 22, passing over and among the seeds and racks, 48, 50. The width of space 52 should be sufficient to accommodate this upward flow but not wider than necessary because this would curtail the space available for racks and crystals 48, 50.

Simultaneously with the upward flow of fluid just described, the cooler and, therefore, denser fluid in the central part of growing region 36 flows axially downwardly over and among the seed bodies in racks 48. This downward flow continues to baffle 78, the upper side of which deflects the flow radially inwardly toward the downward flow-passage comprising central opening 80 and the interior 81 of tubular member 74.

The rate of circulation and the negative temperature gradient existing when equilibrium conditions obtained are interrelated and are primarily a function of or influenced by several factors which will now be enumerated and discussed.

(1) The aspect ratio (i.e., the length-to-diameter ratio) of chamber 22: It will be appreciated that attainment of satisfactory convectional circulation depends on an adequate vertical temperature gradient. It follows, therefore, that a short, squat or horizontally elongated chamber would not be conducive to proper circulation; the chamber must have a length great in comparison with its diameter. In practice it has been found that an aspect ratio of at least 5:1 and preferably 10:1 or 15:1 gives the best results.

(2) Percentage opening provided by baffle member 78: This factor refers to the aggregate minimum cross-sectional area of the flow-passages through which the growing and supply regions are in flow communication, expressed in terms of a percentage of the total cross-sectional area of chamber 22. Thus, in FIGURES 1 and 4, the minimum flow-passage area for upward flow is either the area of the annular space 82 or the annular space 77 between the exterior of tubular member 74 and the periphery of opening 70 in plate 69, whichever is lesser. At this juncture it is pointed out that either of these annular flow-passages, 82 or 77, may be dimensioned to control the rate of upward flow; by using the latter (77), the thickness of the boundary layer of upward flow (which is influenced by passage 82) may be varied independently of the flow rate.

The minimum flow-passage area for downward flow is either the area of the central opening 80 in baffle 78 or the cross-sectional area of the interior 81 of tubular member 74, whichever is lesser. In practice it has been found that best results are obtained where the percentage opening is in the approximate range 3 to 20%, and where the minimum areas of the upward and downward flow-passages are roughly equal.

The percentage opening, controlling the flow rate, exerts a strong influence on the temperature gradient which in turn also affects the flow rate.

(3) Vertical distance between uppermost terminus of upward and lowermost terminus of downward flow-passages: It will be appreciated that in order to obtain the circulation pattern described above, a density differential must exist between the fluid in the vicinity of the respective flow-passages. Since the density gradient exists by virtue of the temperature gradient, the upper terminus of the upward flow-passage must be located a substantial distance above the point where the downward flow-passage opens into the supply region. The distance must be sufficient to obtain a substantial density differential pressure head between the two locations. In FIGURES 1 and 4, the effective distance is that measured from space 82 to the bottom end of tubular member 74.

If the upper terminus of the upward flow-passage and the lower terminus of the downward flow-passage were in the same horizontal plane, as, for example, if baffle member 78 were an annular plate, without tubular member 74, the upward flow would be through the central as well as the peripheral passage and, while the upward flow adjacent the walls might be more vigorous because the fluid there would be hotter, little circulation, if any, of the pattern described would result and there would be considerable turbulence due to the conflict of upward and downward flow in the axial region of chamber 22. It should be understood, however, that while the conical shape of baffle member 78 is of considerable advantage in reducing turbulence and achieving lateral separation of the counterflow, workable circulation can be obtained without this shape. Thus, referring again to the above-mentioned unsatisfactory annular plate baffle, such a baffle is operative when used in conjunction with a tubular member such as 74, as illustrated in FIGURES 8 and 11 and hereinafter described in more detail. This is mentioned at this juncture to emphasize the fact that satisfactory circulation stems primarily from the location of the upper terminus of upward flow-passage 82 a good distance above the lower terminus of the downward flow-passage. If this relation does not exist, the circulation is inadequate and/or otherwise unsatisfactory; if the relation is reversed, i.e., if the lower terminus of the central flow-passage is uppermost (for example, where the baffle 78 is inverted from the illustrated position) the direction of circulation would be reversed and this would not be operative to accomplish the objects of the invention as will be explained hereinbelow.

The vertical distance between the upward and downward flow-passages, like all other factors under discussion, is so interrelated with other factors and conditions as to preclude specification of an inflexible numerical value. However, depending on the aspect ratio of chamber 22, the percentage opening of the baffle, the temperature gradient, etc., the distance would amount to at least about 5% and preferably 30 or 40% of the length of chamber 22. In general, smaller percentages are more suited to autoclaves wherein the volume of chamber 22 is relatively small.

(4) Heat supply and insulation: The (negative) temperature differential between the growing and supply regions, as well as the vertical temperature gradients are closely related to the location, arrangement and relative effectiveness of the heater elements 40 and 42 and insulation 44 and 46. Apparatus of the type described and illustrated in FIGURE 1 may be operated successfully with either bottom heaters (40) or peripheral heaters (42) only but the combination of both is preferred. In any case the heating capicity of the heaters used must be sufficient to raise the average temperature of the transfer fluid to the operating range (280° to 370° C.) in a reasonable time and maintain the desired temperature and temperature gradient (5 to 25° C.) in view of the heat loss permitted by the insulation 44 and 46 and the circulation rate. A full complement of heaters may be used to bring the apparatus to equilibrium operating temperature and then part of the heaters cut out or the power supply to the entire complement reduced.

Preferably the heater complement and insulation 44 cover the bottom of vessel 24 and envelop the sides up to the upper limit of the supply region, which coincides approximately with the top end of container 58. The insulation of supply region 38 preferably is of maximum effectiveness in order to minimize the operating power requirements. The insulation 46 surrounding growing region 36 is of sufficient effectiveness to allow a selected rate and pattern of heat loss through the surrounding walls of vessel 24.

It will be understood that suitable conventional thermocouples and pressure gages (not shown in the drawings) may be utilized to determine, establish and maintain desired operating conditions.

The temperature distribution and heat transfer within the chamber at equilibrium is generally as follows: The transfer medium is at its highest temperature in supply region 38, specifically in the lower reaches of clearance space 72; this is because the transfer medium is heated during its downward flow through tubular member 74 by heat transfer from the hotter ascending fluid surrounding member 74 and is further heated by its proximity to the heated bottom 26 and lower sidewalls at vessel 24 during the time the fluid issues from the lower end of member 74 and reverses its direction. The lowest temperature of the transfer medium usually occurs near the top of the growing region owing to the fact that it has previously ascended the length of the growing region in a relatively thin layer along the walls of vessel 24, continuously giving up heat to the walls. The temperature of the descending fluid in the growing region at the upper side of baffle 78 is usually slightly higher than at the top of the growing region by reason of having mixed with flow branching inwardly from the main upward current in clearance space 52. The temperature differential (negative) between the bottom and top of the growing region account for all or the major part of the 5 to 25° C. differential between the average temperatures of the supply and growing regions. In consequence of the flow pattern and temperature distribution achieved, the descending flow of fluid in growing region 36 remains at substantially a constant temperature because it is surrounded by the upward flow in space 52 which, at any given horizontal level, is at about the same or a higher temperature than the downward flow at that level, thus preventing heat loss from the downward flow. In other words, the temperature differential necessary for crystal growth is established during the ascent of the transfer fluid in space 52 while it is out of contact with the seed bodies. Thereafter, the growing is accomplished by the descending fluid under practically isothermal conditions in the growing region. The result, aside from a high thermal efficiency and consequent low power cost per pound of crystal, is a substantially uniform growth rate on all seed bodies regardless of location in the growing region. The variation in the weight of crystals grown in apparatus according to the invention is only ±5% as compared to ±20 to 40% in conventional apparatus.

Compartmentation of the supply container 58 is not essential but improves circulation and serves to maintain a fairly constant relation and maximum contact between the supply material and the circulating fluid; otherwise, as the run progresses the unconsumed supply material settles to the bottom of the container where it is bypassed by some of the fluid moving upwardly in the supply region.

A detailed description has been given of one preferred form of apparatus according to the present invention. Many variations are possible in the physical structure of the apparatus illustrated in FIGURE 1 which also give satisfactory results by virtue of the fact that generally the same growing conditions may be achieved with a modified configuration. Inasmuch as these modifications relate to the circulation control means and/or the disposition of the supply material, the following description of examples of such modifications is restricted to these features.

Figure 5:
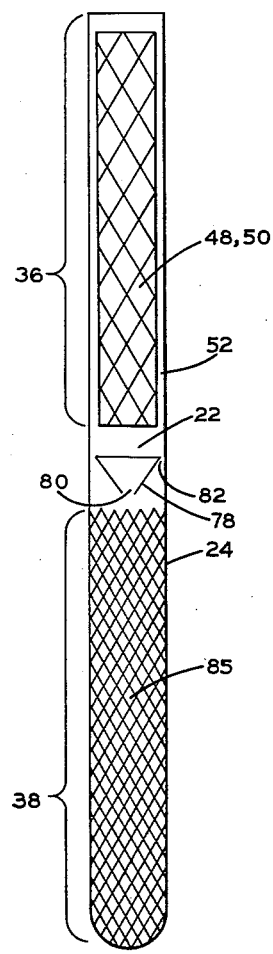
FIGURE 5 is a schematic view similar to FIGURE 4 showing a modified form of the invention.

FIGURE 5 is a schematic view similar to FIGURE 4 showing a somewhat simplified apparatus which may be preferred for smaller units. In FIGURE 5 parts in common with FIGURES 1 to 4 are identified with the same reference numerals with a lower case letter appended in instances where the designated part is modified. This same system of designation is adhered to throughout the description of various modifications hereinbelow.

It will be readily apparent from an inspection of FIGURE 5 that its chief distinctions over the previously described apparatus resides in its simplification by the elimination of the tubular member 74 and supply container 58. Thus the flow control means comprises baffle member 78 which takes the form of a simple hollow, truncated cone coaxially disposed in chamber 22 between the growing region 36 and supply region 38 with its apex pointing downwardly. Inasmuch as FIGURE 5 is a schematic drawing, the manner in which baffle member 78 is supported is not shown. It will be understood, however, that mounting of baffle member 78 may be accomplished as shown in FIGURE 1 or by any other suitable means. To simplify loading of the supply material the baffle mounting should permit its easy removal. Furthermore, such mounting need not possess substantial mechanical strength unless used to support the crystals and racks 48, 50 and then only sufficient to accomplish this purpose.

In the FIGURE 5 apparatus, the supply material 85, is placed loose in the bottom of chamber 22. In the absence of a container therefor, it may be desirable that the material be in the form of relatively larger chunks to provide interstices of large volume to facilitate circulation therethrough of the transfer medium. The general overall functioning of the apparatus is essentially the same as that already described.

FIGURES 1 and 4 on one hand and FIGURE 5 on the other are illustrative of two basic variations of the apparatus, namely, the presence or absence of the supply container 58 and of the tubular member 74. Either of these basic variations may be further modified in the specific configuration of baffle member 78.

Thus, FIGURES 6 and 9 illustrate a baffle member 78a of generally conical configuration but having curved instead of straight sides so that the baffle resembles a hollow spherical or parabolic section having its underside convex and its upperside concave. Baffle 78a is shown as having a coaxial hollow tubular appendage 74a extending downwardly toward the supply chamber. This appendage may extend, or be connected to a tubular member (such as 74, FIGURES 1 and 2) which extends, to within a short distance of the bottom of chamber 22. Alternatively the appendage 74a may be quite short and serve merely to concentrate and give direction to the downward fluid flow therein.

Baffle member 78a is supported by three or more (four shown) peripheral ears 84a, analogous to bracket 84, FIGURE 1, which frictionally engage the inner surface of vessel 24.

FIGURES 7 and 10 illustrate another form of baffle, 78b, which is similar in configuration to baffle 78 but has a hollow cylindrical coaxial skirt 86 extending upwardly from its large diameter end. The radially outer surface of skirt 86 is spaced inwardly from the walls of vessel 24 by an amount substantially equal to the radial dimension of clearance space 52. In addition to giving direction to the upward flow of the transfer medium and assisting the establishment of a hollow cylindrical flow path in growing region 36, skirt 86 prevents the rising fluid from being drawn radially inwardly after clearing the baffle by the downwardly flowing fluid entering the baffle from above.

Baffle member 78b is centered and supported in chamber 22 by a number of radial spring loops 84b which frictionally engage the inner wall of vessel 24.

As previously mentioned, the baffle member may take the form of a flat annular plate having a tubular member such as 74 extending downwardly from the central aperture therein. Baffle member 78c, FIGURES 8 and 11, is a baffle of this type. It is re-stated that in such a baffle, tubular member 74 is not optional; it is essential and must be of sufficient length to effect substantial longitudinal spacing of the upper terminus of the upward flow-passage above the lower terminus of downward flow-passage.

As shown in FIGURES 8 and 11, baffle member 78c is a flat, annular plate centered and supported in chamber 22 by a number of symmetrically spaced spring loops 84b. Tubular member 74 has its upper end fitted into the central aperture of the plate. The lower end of the tubular member ends downwardly in the supply region by an amount sufficient to utilize the density differential to cause circulation as already explained. It is pointed out that the necessity of having the tubular member 74 does not carry with it the need of a container for the supply material although the container simplifies the matter of getting the tubular member through the material.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. Apparatus for the hydrothermal synthesis of quartz in single crystal form comprising: means defining a vertically elongated enclosed chamber adapted to contain a fluid transfer medium under conditions of high temperature and pressure, said chamber having a quartz growing region in its upper end and a source material supply region in its lower end; means operative to supply heat to the lower end of said chamber; and circulation control means in said chamber including a baffle interposed between said growing and supply regions, said circulation control means being so constructed and arranged as to define, and limit flow communication between said regions to, an upward flow passage and a downward flow passage, jointly controlling and directing the convectional flow of such a fluid transfer medium due to heat supplied by said heat supply means, each of said passages, individually having a cross-sectional area relatively small in comparison to that of said chamber, said downward flow-passage being substantially centrally located with respect to the vertical centerline of said chamber, said upward flow-passage being located adjacent the laterally outer limits of said chamber and opening into said growing region a substantial distance above the location where said downward flow passage opens into said supply region.

2. Apparatus for the hydrothermal synthesis of quartz, in single crystal form, comprising: means defining a vertically elongated enclosed cylindrical chamber the length of which exceeds the diameter by a factor of at least about 5, said chamber being adapted to contain a fluid transfer medium under conditions of high temperature and pressure and having a quartz growing region occupying, at least, approximately the upper half of said chamber, and a source material supply region in its lower end; means operative to supply heat to the lower end of said chamber; said heat supply means being of sufficient capacity to establish and maintain an average temperature of at least 280° C. in such fluid; and circulation control means in said chamber including a baffle member interposed between said growing and supply region, said circulation control means being so constructed and arranged as to define in said chamber, and limit communication between said regions to, an upward flow-passage and a downward flow-passage, jointly controlling and directing the convectional flow of such a fluid medium due to heat supplied by said heat supply means, the aggregate minimum flow area of said passages amounting to less than about 20% of the cross-sectional area of said chamber, said upward flow passage being generally annular in cross-section and located in proximity to the vertical walls of said chamber, said downward flow-passage being proximate the vertical axis of said chamber and opening into said supply region a substantial distance below the location where said upward flow passage opens into said growing region.

3. Apparatus according to claim 2 wherein said baffle member is shaped to direct upward flow of such fluid transfer medium in said supply region radially outwardly toward said upward flow-passage and the downward flow of such medium in said growing region radially inwardly toward said downward flow-passage.

4. Apparatus for the hydrothermal synthesis of quartz in single crystal form, comprising: means defining a vertically elongated enclosed cylindrical chamber having a length-to-diameter ratio of from 5:1 to 15:1 and being adapted to contain a fluid transfer medium at temperatures up to about 400° C. and pressures up to 10,000 pounds per square inch, said chamber having a quartz growing region occupying at least approximately its upper half and a crystalline silica supply region in its lower end; means operative to supply heat to the bottom and to the sides of the growing region of said chamber; insulation means surrounding said chamber, so constructed and arranged to preclude substantial heat loss from said supply region and to allow heat loss at a preselected rate from said growing region; a perforate container for crystalline silica supply material disposed and supported in said supply region with substantial clearance between the bottom and sides of said chamber and container, respectively; a transverse baffle member in said chamber interposed between said supply and growing regions, said baffle member being so constructed and arranged as to define, and limit communication between said growing and supply regions to, an upward axial flow-passage and a downward axial flow-passage, jointly controlling the rate and directing the path of convectional circulation of such fluid medium, the flow area of said passages individually being approximately equal and, in the aggregate, amounting to less than about 20% of the cross-sectional area of said chamber, said upward flow-passage being generally annular in cross-section, concentric with the vertical axis of said chamber, and located adjacent the sidewalls of said chamber, said downward flow-passage being of circular cross-section, concentric with said vertical axis and opening into said supply region at a location substantially below the upper terminus of said upward flow-passage; and seed holder means in said growing regions adapted to hold a plurality of quartz seeds in spaced relation and so disposed as to define a substantially unobstructed clearance space adjacent the walls of said chamber and surrounding the seed holder, said clearance space extending substantially the entire length of said growing region from the upper terminus of said upward flow-passage to the top of said chamber.

5. Apparatus according to claim 4 wherein said downward flow-passage includes a tubular member extending coaxially downward from said baffle member, through said container, and terminating short of the bottom of said chamber.

6. Apparatus for the hydrothermal synthesis of quartz in single crystal form, comprising: means defining a vertically elongated enclosed cylindrical chamber having a length to diameter ratio of from 5:1 to 15:1 and being adapted to contain a fluid transfer medium at temperatures up to about 400° C. and pressures up to 10,000 pounds per square inch, said chamber having a quartz growing region occupying, at least, approximately the upper half of its length and having a crystalline silica supply region occupying substantially the entire remaining length of said chamber; means operative to supply heat to the bottom and sides of the supply region of said chamber; insulation means surrounding said chamber, so constructed and arranged to preclude substantial heat loss from said supply region and to allow heat loss at a preselected rate from said growing region; an elongated, perforate container for crystalline silica coaxially disposed and supported in said growing region with its bottom and outer sides spaced, respectively, from the bottom and sidewalls of said chamber said container having a longitudinal central opening therethrough; a transverse baffle member in said chamber interposed between said supply and growing regions, said baffle member containing a central aperture concentric with the vertical axis of said chamber and, defining, with the laterally adjacent side walls of said chamber, an annular passage between the perimeter of said baffle member and said side walls the area of said aperture and of said passage being approximately equal and, in the aggregate, amounting to less than about 20% of the cross-sectional area of said chamber; a tubular member, connected to said baffle in flow communication with the said aperture, extending coaxially downward, with substantial peripheral clearance, into the opening in said container and terminating short of the bottom of said chamber; and seed holder means in said growing regions adapted to hold a plurality of quartz seeds in spaced region and so dispersed as to define an unobstructed clearance space adjacent the walls of said chamber and surrounding the seed holder, said clearance space extending substantially the entire length of said growing region from the upper side of said baffle member to the top of said chamber.

7. Apparatus according to claim 6 wherein said container comprises a plurality of horizontal perforate partitions dividing it into a number of separate compartments.

8. Apparatus according to claim 6 wherein said baffle member is a flat plate.

9. Apparatus according to claim 6 wherein said baffle member includes a coaxial hollow cylindrical portion on the perimeter thereof extending upwardly into said growing region.

10. Apparatus according to claim 6 wherein the underside of said baffle member slopes upwardly and outwardly from said aperture to its perimeter and the upper surface of said baffle member slopes inwardly and downwardly from its perimeter to said aperture.

11. Apparatus for the hydrothermal synthesis of quartz in single crystal form, comprising: means defining a vertically elongated enclosed cylindrical chamber having a length to diameter ratio of from 5:1 to 15:1 and being adapted to contain a fluid transfer medium at temperatures up to about 400° C. and pressures up to 10,000 pounds per square inch, said chamber having a quartz growing region at its upper end and a silica supply region at its lower end; means operative to supply heat to the bottom and sides of the growing region of said chamber; insulation means surrounding said chamber, so constructed and arranged to preclude substantial heat loss from said supply region and to allow heat loss at a preselected rate from said growing region; an elongated, perforate container of annular cross-section coaxially disposed and supported in said growing region with its bottom and outer sides spaced, respectively, from the bottom and side walls of said chamber; a transverse baffle member of hollow conical configuration coaxially disposed in said chamber between said supply and growing regions with its maximum circumference uppermost and radially inwardly spaced from the walls of said chamber so as to define therewith an annular passage, said baffle member having a central aperture in its lower end, the flow area of said aperture and of said passage being approximately equal and, in the aggregate, amounting to less than about 20% of the cross-sectional area of said chamber; and seed holder means in said growing regions adapted to hold a plurality of quartz seeds in spaced relation and so disposed as to define an unobstructed clearance space adjacent the walls of said chamber and surrounding the seed holder, said clearance space extending substantially the entire length of said growing region from the upper side of said baffle member to the top of said chamber.

12. Apparatus according to claim 11 including a tubular member connected to said baffle in flow communication with said aperture, extending downward with substantial peripheral clearance into said container and terminating short of the bottom of said chamber.

References Cited in the file of this patent

UNITED STATES PATENTS

| | | |
|---|---|---|
| 1,353,571 | Dreibrodt | Sept. 20, 1920 |
| 2,675,303 | Sobek et al. | Apr. 13, 1954 |
| 2,785,058 | Buehler | Mar. 12, 1957 |

FOREIGN PATENTS

| | | |
|---|---|---|
| 682,203 | Great Britain | Nov. 5, 1952 |

OTHER REFERENCES

Walker et al.: "Industrial and Engineering Chemistry," July 1950, vol. 42, No. 7, pages 1369 to end.